(12) United States Patent
Kawaguchi

(10) Patent No.: US 6,714,532 B1
(45) Date of Patent: Mar. 30, 2004

(54) NETWORK CONNECTING METHOD AND DEVICE

(75) Inventor: Kenji Kawaguchi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/516,248

(22) Filed: Mar. 1, 2000

(30) Foreign Application Priority Data

May 10, 1999 (JP) ............................................ 11-129063

(51) Int. Cl.⁷ .............................................. H04L 12/28
(52) U.S. Cl. ........................ 370/351; 370/352; 370/397; 370/395.53
(58) Field of Search ................................ 370/351, 352, 370/353, 354, 355, 356, 363, 395.1, 396, 397, 399, 395.52, 395.54, 401, 404, 403, 402, 468, 466, 395.53; 709/224

(56) References Cited

U.S. PATENT DOCUMENTS

| | | | |
|---|---|---|---|
| 5,909,441 A | * 6/1999 | Alexander | 370/395 |
| 6,178,171 B1 | * 1/2001 | Alexander | 370/395 |
| 6,279,035 B1 | * 8/2001 | Brown | 709/224 |
| 6,452,921 B1 | * 9/2002 | Alexander | 370/351 |
| 6,483,832 B1 | * 11/2002 | Civanlar | 370/390 |

OTHER PUBLICATIONS

AF–MPOA–0087.000 MPOA Version 1.0 p. 24.
MPOA Version 1.0, AF–MPOA–0087.000 p. 31.

* cited by examiner

Primary Examiner—Douglas Olms
Assistant Examiner—Ricardo M. Pizarro
(74) Attorney, Agent, or Firm—Antonelli, Terry, Stout & Kraus, LLP

(57) ABSTRACT

A network connecting device 100 comprises a LAN I/F 130 for performing communications with a LAN, a N-ISDN I/F 170 for performing a connectionless transmission, and a ATM I/F 160 for performing a connection-oriented transmission. A plurality of networks having different transfer systems are separately used, and communication channels are switched as occasion demands. A connection table section 200 holds correspondence among individual communication channels. A channel setting control program section 500 allocates a communication channel for new communication data. A kicking-out program section 1300 makes a communication channel used for low-priority communication data available for high-priority communication data. A recovery program section 700 reallocates a communication channel for communication data that has changed a communication channel after completion of high-priority communications. Thus, during connecting the LAN with a wide area communication network, data packets currently under call setting control ca be prevented from staying, and line utilizing efficiency ca be increased.

19 Claims, 14 Drawing Sheets

FIG.4

200
CONNECTION TABLE SEC

| 210 COMMUNICATION DATA CONDITION PART | | 230 QUALITY INSTRUCTION PART | 220 OUTPUT INSTRUCTION PART | 240 TIME-OUT FLAG | 250 SORTING KEY |
|---|---|---|---|---|---|
| CALL ORIGINATION ID | DESTI- NATION ID | CALL ORIGINATION PORT ID | DESTINATION PORT ID | BAND, QoS | I/F#, VC, ATM ADDRESS | INITIAL VALUE | POSITIVE INT/0 | PRIORITY VALUE |
| .. | .. | .. | .. | .. | .. | .. | .. | .. |

PRIORITY CONDITION TABLE SEC 300

| CONDITION PART 310 | | | | | PRIORITY PART 320 | QUALITY INSTRUCTION PART 330 | TIME-OUT VALUE 340 |
|---|---|---|---|---|---|---|---|
| CALL ORIGINATION ID | DESTINATION ID | DESTINATION PORT ID | MASK VALUE | TIME ZONE | PRIORITY VALUE | BAND, QoS | POSITIVE INTEGER |
| .. | .. | .. | .. | .. | .. | .. | |

FIG.5

NETWORK CONNECTING METHOD AND DEVICE

BACKGROUND OF THE INVENTION

The present invention relates to a method and an apparatus for network connection, which interconnect various networks, e.g., a Local Area Network (LAN) with a wide area network or the like. More particularly, the invention relates to a -method and an apparatus for network connection, which perform communication channel allocation for the wide area network in order to ensure communication quality.

Communications between private networks located in remote areas must be carried out through a wide area communication network. Also, data communications carried out by connecting the LAN with the wide area communication network must employ a network connecting device called a router. In this case, depending on differences in communication systems among wide area networks to be utilized, a method for providing a communication channel to the router may vary in a following manner.

A circuit switching system is available as one of the communication systems among the wide area communication networks. In this system, communication lines are linked beforehand between a user and a switching system and between switching systems. But none of the lines is closed, and no communication channels are provided between users in a normal state. To provide a communication channel for connecting specific two points, communication lines are connected to each other in the switching system by signaling process corresponding to a connection destination that a user specifies by calling before the start of communications. Such a method of transferring communication data, which is accompanied by call control processing, is called a connection-oriented transmission.

In the case of a device called a dial-up router, a connection destination is specified based on protocol control information of packet data carried on a LAN, and the packet data on the LAN is transmitted to the communication channel provided by the foregoing system. Accordingly, inter-LAN communications can be carried out by changing connection destinations when necessary. Similarly, in the circuit switching system, by using the communication channel provided by the communication line which connects the predetermined two points beforehand, the need to perform signaling process can be eliminated at each starting of communications. The communication line provided in such a manner is called a leased line. In the case of a device called a remote router, inter-LAN communications can be carried out by transmitting packet data on the LAN to the communication channel on the leased line.

There is another different communication system called a packet switching system. Also, for this system, communication lines are linked beforehand between a user and a switching system and between switching systems. In the packet switching system, however, communication lines are not so configured as to connect predetermined two points before the start of communications by signaling or a leased line like that in the circuit switching system. Instead, each switching system interprets protocol control information of the packet data on the LAN and, then, by selecting a switching system of a transfer destination and repeating transfer, transmits the packet data to a LAN of communication destination. Thus, one communication channel is always provided to the user and, by using this channel, the user can communicate with all the LANs that need to be connected. Such a method of transferring communication data, which is not accompanied by any signaling process, is called a connectionless transmission.

There is yet another system called an Asynchronous Transfer Mode (ATM) communication system. In this system, as in the case of the circuit switching system, a communication channel to connect predetermined two points is allocated corresponding to a connection destination that a user specifies by calling before the start of communications. But a communication line between switching systems is not directly connected, and only the correspondence thereof is held. A logical number for identifying the correspondence is provided to the user as a number for identifying the communication channel. The user adds this logical number to packet data, and then transmits the data. Each switching system selects a communication line to be used for transfer based on the logical number added to the packet data. Accordingly, a plurality of communication channels can be provided separately by one communication line. Also, by means of setting made beforehand as in the case of the circuit switching system, a predetermined communication channel can be used as a permanently set leased line.

In any of the above systems, it is necessary to establish correspondence between the protocol control information of the packet data on the LAN and the communication channel provided by the wide area communication network. As a method for this purpose, a Multi-Protocol over ATM (MPOA) is available, which makes a detailed description especially of the ATM communication system. In accordance with this method, a device having an address translation function and a packet switching function is provided on the communication network of the ATM system, and a communication channel for communicating with the device is permanently set. The user can transmit the data packet on the LAN to the permanently set communication channel, and can also transmit the packet data to a newly set communication channel by using the address translation function to decide a connection destination.

For data communications on the wide area communication network, if the packet switching system is used, which multiplexes all packet data on one communication channel, it is difficult to maintain, for a long time, communication quality such as assurance of a constant bandwidth keeping of constant transmission delay time or the like. On the other hand, if the circuit switching system is used, which allocates individual communication channels for respective data communications, data packets from the LAN can stay in the network connecting device during signaling process for allocating the communication channels. Therefore if the communication traffic is heavy, the data packet may be discarded, and normal communications may not be established. If the leased line is used, since a communication line connected to a specified opposite point is continuously held even when there is no data packet to be transmitted, efficiency may be reduced.

Also, in the case of logically setting communication channels by the packet switching system or the ATM communication system, similar cases may occur. This is because switching system resources are held by setting of each switching system or by. reservation for use of a buffer or the like.

SUMMARY OF THE INVENTION

It is therefore an object of the present invention to prevent data packets from staying in the network connecting device during allocation of individual communication channels for respective communications. This is achieved by selecting a connectionless transmission network such as the packet switching system or the leased line and a connection-oriented transmission network such as the circuit switching system. In this case, according to the invention, a plurality of networks operated by different subjects are used in free combination while the connectionless transmission network and the connection-oriented transmission network are kept independent of each other. Also, another object of the invention is that under an artificially specified condition one to be used for communications is selected from the plurality of networks and used.

Regarding allocation of individual communication channels for respective data communications, allocation is carried out in the starting order of communications. In this case, if a transfer capability of the network reaches saturation, no new communication channels can be allocated for subsequent new data communications. Consequently, the network may be occupied by the existing users in the circuit switching system, and new users cannot make instantaneous use of the network. Also, in the packet switching system, communication quality provided by the entire network may deteriorate.

It is therefore an object of the present invention to allocate communication channels for subsequent data communications according to the necessity thereof. This allocation is achieved by preventing communication lines from being occupied by the previous users while preventing deterioration of communication quality provided by the entire network or a reduction in line use efficiency. The present invention is also aims to allow quality deterioration can be limited to only partial communication data. This is achieved by switching the communication channels that respective communication data use, in connection with a state of congestion of the communication lines.

Yet another object of the invention is, among data communications set priorities, to allocate an individual communication channel to data communications having a highest priority and enable the data communication to be started, without holding unused a part of a communication line capacity beforehand and irrespective of the starting order of data communications. In this case, even data communications having a lowest priority can be continued.

In accordance with, the first solving means of the present invention, a network connecting method in a network connecting device, the network connecting device including:
  first communicating means for performing communications with a first communication network such as a local area network;
  connectionless (CL) communicating means for performing a CL transmission with a second communication network; and
  connection-oriented (CO) communicating means for performing a CO transmission with a third communication channel,
  the network connecting method comprising the steps of:
    storing in first storing means at least a part of protocol control information and communication channel identifying information in a corresponding relationship, the protocol control information being of data on the first communication network, and the communication channel identifying information being for identifying a communication channel with a second, alternatively third wide area communication network; and
    performing channel control for changing a entry having communication channel identifying information which indicates the CO communicating means to a entry having communication channel identifying information which indicates the CL communicating means, by referring to the communication channel identifying information held in the first storing means.

In accordance with the second solving means of the invention, a network connecting method in a network connecting device, the network connecting device including:
  first communicating means for performing communications with a first communication network such as a local area network;
  connectionless (CL) communicating means for performing a CL transmission with a second communication network; and
  connection-oriented (CO) communicating means for performing a CO transmission with a third communication network,
  the network connecting method comprising the steps of:
    storing in first storing means at least a part of protocol control information and communication channel identifying information in a corresponding relationship, the protocol control information being of data on the first communication network, and the communication channel identifying information being for identifying a communication channel with a second, alternatively third wide area communication network; and
    performing channel control for recovering a entry having communication channel identifying information which indicates the CL communicating means as a entry having communication channel identifying information which indicates the CO communication means, by referring to the communication channel identifying information held in the first storing means.

In accordance with the third solving means of the invention, a network connecting device comprising:
  first communicating means for performing communications with a first communication network such as a local area network;
  connectionless (CL) communicating means for performing CL transmission with a second communication network;
  connection-oriented (CO) communicating means for performing a CO transmission with a third communication network;
  first storing means for storing at least a part of protocol control information and communication channel identifying information in a corresponding relationship, the protocol control information being of data on the first communication network, and the communication channel identifying information being for identifying a communication channel with a second, alternatively third wide area communication network; and
  channel control means for changing a entry, which has communication channel identifying information indicating the CO communicating means to a entry, which has communication channel identifying information indicating the CL communicating means, by referring to the communication channel identifying information held in the first storing means.

In accordance with the fourth solving means of the invention, a network connecting device comprising:
  first communicating means for performing communications with a first communication network such as a local area network;
  connectionless (CL) communicating means for performing a CL transmission with a second communication network;
  connection-oriented (CO) communicating means for performing a CO transmission with a third communication network;
  first storing means for holding at least a part of protocol control information and communication channel identifying information in a corresponding relationship, the protocol control information being of data on the first communication network, and the communication channel identifying information being for identifying a communication channel with a second, alternatively third wide area network; and channel control means for recovering a entry, which has communication channel identifying information indicating the CL communicating means, as a entry which has communication channel identifying information indicating the CO communicating means, by referring to the communication channel identifying information held in the first storing means.

In accordance with the fifth solving means of the invention, a network connecting device comprising:

first communicating means for performing communications with a first communication network such as a local area network;

connectionless (CL) communicating means for performing a CL transmission with a second communication network;

connection-oriented (CO) communicating means for performing a CO transmission with a third communication network;

first storing means for holding at least a part of protocol control information and communication channel identifying information in a corresponding relationship, the protocol control information being of data on the first communication network, and the communication channel identifying information being used by the CL and CO communicating means;

second storing means for holding the at least a part of protocol control information and sequence information in a corresponding relationship, the protocol control information being of data on the first communication network, and the sequence information for sequencing;

channel setting control means for adding a new first entry containing at least a part of the protocol control information of data on the first communication network to the first storing means, and updating communication channel identifying information of the first entry to one for using the CL communicating means; and kicking-out means for deciding, among entries using the CO communicating means, a entry to be changed to one for using the CL communicating means by referring to at least a part of protocol control information of a data packet held in the first storing means and the sequence information held in the second storing means, and then updating the communication channel identifying information held in the first storing means to indicate the CL communicating means for the decided entry.

In order to solve the foregoing problems, an Internet switching system of the present invention is a network connecting device designed to connect a LAN to a wide area communication network. This network connecting device comprises: communicating means for performing a connectionless transmission with the wide area communication network; communicating means for performing a connection-oriented transmission with the wide area communication network; first storing means for holding, in a corresponding relationship, a part or all of protocol control information of a data packet on the LAN, information for identifying communicating means with the wide area communication network, information for identifying a communication channel to be used in the communication means, information for identifying a connection destination of the communication channel, information for indicating communication capabilities such as a communication band or quality provided by the communication channel, a logical true/false value for determining time-out, which indicates a used state of the communication channel, and an integral value for ordering; means for updating the logical true/false value for time-out determination to be false by referring to the protocol control information of the data packet on the LAN and the information held in the first storing means, and then transferring the data packet by using the communicating means with the wide area communication network; second storing means for holding, in a corresponding relationship, a part or all of the protocol control information of the data packet on the LAN, a time zone, an integral value indicating priority, and information indicating a required communication band or quality; means for deciding a communication channel to be used by the transmitting means with the wide area communication network by referring to the protocol control information of the data packet on the LAN and the information held in the second storing means, and then updating the information held in the first storing means; means for selecting from the information held in the first storing means one item having a communication channel used for a connectionless transmission, and one item having a communication channel used for a connection-oriented transmission, both ones having the identical information for identifying a communication channel connection destination, and then switching the information for identifying the communication channels therebetween, thus updating the information thereof; means for updating a false logical true/false value for determining time-out to be true at every constant interval of time by referring to the information held in the first storing means; means for selecting one item having a communication channel for the connectionless transmission, and one item having a logical true/false value set true for time-out determination, from. those which have the same information for identifying a communication channel connection destination from the information held in the first storing means at every constant interval of time, and then switching the information for identifying the communication channel therebetween, thus updating the information thereof; and means for sorting the items in order in accordance with an integral value for ordering by referring to the information held in the first storing means.

Furthermore, a method for controlling the means for deciding the communication channel used for the communicating means includes the steps of: storing in the first storing means, in a corresponding relationship, a part or all of the protocol information of a data packet on the LAN, the information for identifying communicating means for performing a connectionless transmission with the wide area communication network, information for identifying a preset communication channel used by the communicating means, and setting a logical true/false value for determining time-out for the item to be false; if the protocol control information of the data packet on the LAN coincides with the information held in the second storing means, performing call setting control for setting a communication channel to be used by communicating means by using the communicating means for performing a connection-oriented transmission with the wide area communication network; if the call setting control in the previous step succeeds, updating, among the items stored in the first storing means in the previous step, the information for identifying the communication channel, the information for identifying the communication channel connection destination, the logical true/false value for time-out determination, and the integral value for ordering; and if the call setting control in the previous step fails, using means that selects, from the information held in the first storing means, one item having the communication channel for the connectionless transmission and one item having the communication channel for the connection-oriented transmission, and then switches and updates the information for identifying the communication channels therebetween. The communication channels used in data packet communication on the LAN can be switched successively when necessary, using the network connecting device.

BRIEF DESCRIPTION OF THE DRAWINGS

FIG. 4 is a view illustrating configuration of a connection table section 200.

FIG. 5 is a view illustrating a priority condition table section 300.

DETAILED DESCRIPTION OF THE PREFERRED EMBODIMENTS

(1) Configuration of Network and Network Connecting Device

Figure 1:
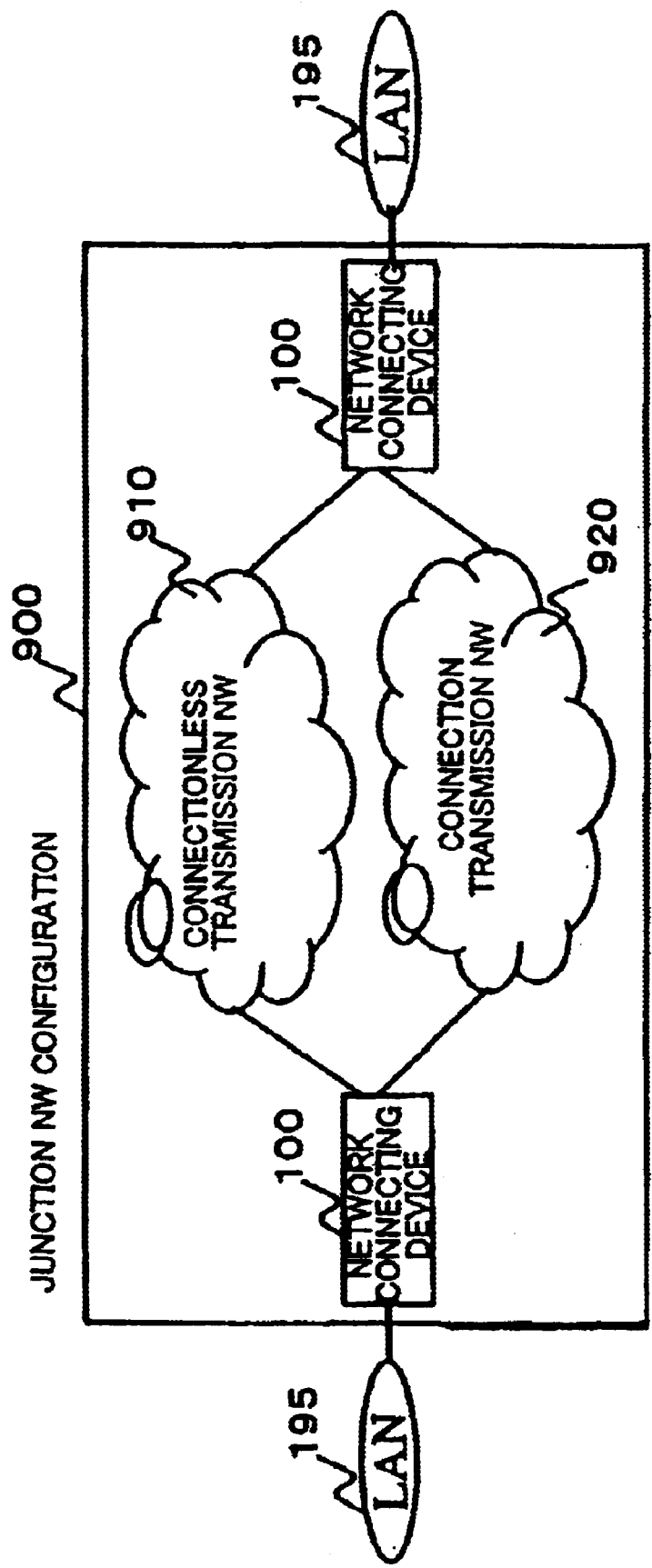
FIG. 1 is a view (1) illustrating junction network configuration for inter-LAN connection.

FIG. 1 is a view (1) illustrating configuration of a junction network for inter-LAN connection.

The junction network includes LANs 195, network connecting devices 100, a connectionless transmission network 910, and a connection-oriented transmission network 920. The LANs 195 are connected to both of the connectionless and connection-oriented transmission networks 910 and 920 using the respective network connecting devices 100.

To connect the LANs 195 to each other through a wide area communication network by using the network connecting devices 100, a junction network 900 is configured by combining the connectionless transfer network 910, which enables a connectionless transmission with the connection-oriented transmission network 920, which enables a connection-oriented transmission. As an example of the connectionless transmission networks a network that is configured by connecting routers to each other by a communication line capable of using a permanently set communication channel may be used. As an example of the connection-oriented transmission network, a network that is composed of a telephone exchange, a frame relay switching system or an ATM switching system may be used.

In this embodiment, in a call originating side (left side in the drawing), the network connecting device 100 connects a call originated from the LAN 195 to the connectionless transmission network 910 or the connection-oriented transmission network 920. On the other hand, in a call incoming side (right side in the drawing), the network connecting device connects the connectionless transmission network 910 or the connection-oriented transmission network 920 to the LAN 195.

Figure 2:
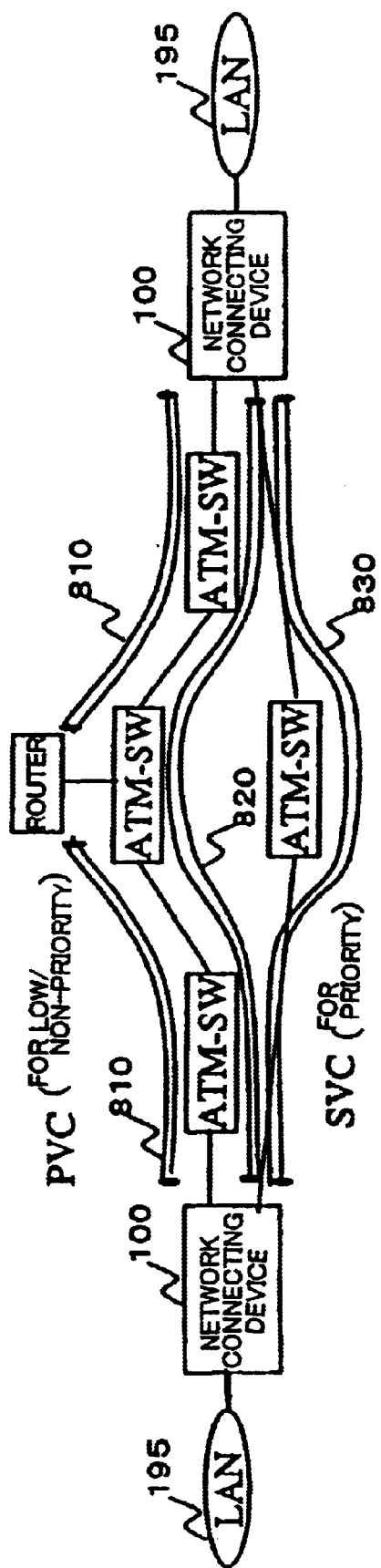
FIG. 2 is a view (2) illustrating junction network configuration for inter-LAN connection.

FIG. 2 is a view (2) illustrating configuration of a junction network for inter-LAN connection. This junction network includes LANs 195, network connecting devices 100, ATM-SWs and a router. The LANs 195 are connected to each other through the network connecting devices 100, the ATM-SWs and the router by a permanently set channel (for low/non-priority communications) 810, an Unspecified Bit Rate (UBR) type channel 820, and a temporarily allocated channel (for priority communications) 830.

Especially, if a line I/F capable of setting a plurality of channels on one communication line, e.g., a frame relay, an ATM or. an N-ISDN, is used, similar connection configuration is realized by separately using the permanently set channel 810 and temporarily allocated channel 830 on one physical line. Also, as a later described embodiment, the permanently set communication channel may be used for temporarily kicking out non-priority data or relatively low priority data. In addition, for example, where the ATM communication network is used as a junction network, the UBR type communication channel 820 may always be provided when call setting control for setting individual communication channels between the LANs is executed, and may be used selectively for the purpose of temporary evacuation channel for non-priority data or low priority data. If the N-ISDN is used, a D channel is used as a channel using the connectionless transmission network, and a B channel is used as a channel using the connection-oriented transmission network.

When a voice packet on an extension telephone network or the LAN is transmitted to a wide area network, by successively switching destinations between an Internet and an existing telephone network, a using mode can be selected flexibly according to priority, quality and costs.

Figure 3:
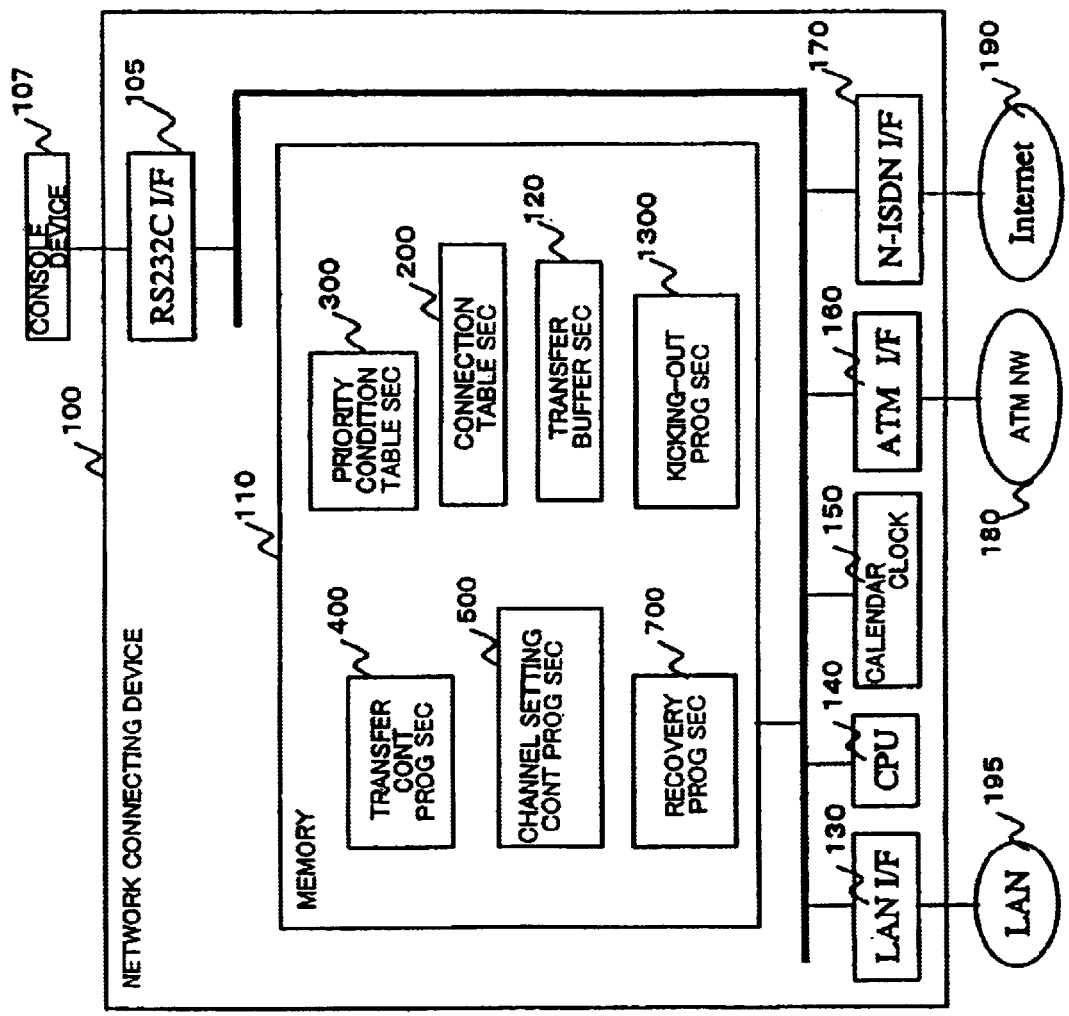
FIG. 3 is a view illustrating entire configuration of a network connecting device of the present invention.

FIG. 3 is a view showing configuration of an entire network connecting device of the invention. The network connecting device 100 comprises a memory 110, an RS232C I/F 105, a LAN I/F 130, a CPU 140, a calendar clock 150, an ATM I/F 160 and an N-ISDN I/F 170. The memory 110 includes a priority condition table section 300, a connection table section 200, data storing means such as a transfer buffer section 120, a transfer control program section 400, and means for performing channel control, such as a channel setting control program section 500, a recovery program section 700, a kicking-out program section 1300 or the like. The LAN I/F 130 is connected to the LAN 195; the ATM I/F 160 to an ATM network; and the N-ISDN I/F 170 to an Internet 190. The memory 110, the RS232C I/F 105, the LAN I/F 130, the CPU 140, the calendar clock 150, the ATM I/F 160 and the N-ISDN I/F 170 are interconnected by proper means such as a bus or the like. A console device 107 is connected through the RS232C I/F 105 to an internal bus.

Using in the network connecting device 100, for example, the LAN 195 is connected to the ATM communication network 180 or the Internet 190 as a kind of a broadband wide area network, and data packet switching can be performed with a remote LAN. The LAN I/F 130 is a means for performing, communications between the LAN 195 and the network connecting device 100. The ATM I/F 160 is a means for performing communications between the ATM communication network 180 and the network connecting device 100.

The N-ISDN I/F 170 is used as a leased line which connects a router or the like of the Internet 190 by providing an permanently set communication channel, for the purpose of enabling a connectionless transmission to- be performed. To perform the connectionless transmission, connection may be made to another network such as a packet switching network or the like by using the other communication I/F capable of always sending data packets without any signaling. The ATM I/F 160 is used for performing a connection-oriented transmission, which allocates individual communication channels for respective communication data to ensure communication quality, such as a constant bandwidth. To perform the connection-oriented transfer, connection may be made to a circuit switching network by using a communication I/F, which can provide a plurality of communication channels thereon like a Frame Relay Service network.

FIG. 4 is a view illustrating configuration of the connection table section 200. The connection table section 200 is composed of a communication data condition part 210, a quality instruction part 230, an output destination instruction part 220, a time-out flag 240 and a sorting key 250. The communication data condition section 210 includes a call origination ID, a destination ID, a call origination port ID, and a destination port ID. The quality instruction part 230 includes, for example, information regarding a band or Quality of Service (QoS). The output destination instruction part 220 includes an IF number, a VC, an ATM address, and so on. The time-out flag 240 includes an initial value, and information regarding time-out of a positive integer/0. The sorting key 250 includes a priority value for connection.

FIG. 5 is a view illustrating configuration of the priority condition table section 300. The priority condition table 300 is composed of a condition part 310, a priority part 320, a quality instruction part 330, and a time-out value 240. The condition part 310 includes a call origination ID, a destination ID, a destination port ID, a mask value, and a time zone. The priority part 320 includes a priority value. The quality instruction part 330 includes, for example information regarding a band or QoS. The time-out value 340 includes a positive integer for time-out. In the priority condition table section 300, information is defined beforehand to be used as a criterion for priority processing. This information is edited by a network operator or a user by using the console device 107. The information is distributed from a remote device through a network by using a data transfer control protocol such as a File Transfer Protocol (FTP), a Hyper Text Transfer Protocol (HTTP), a Lightweight Directory Access Protocol (LDAP), a Simple Network Management Protocol (SNMP) or the like. The information is also edited from a remote administration device through a network by using a virtual terminal control protocol such as a TELNET. Also, information regarding a time zone enables selection or various processing operations to vary between day and night, from day to day of the week or timewise. The protocol control information can contain, for example, a call origination ID, a destination ID, a call origination port ID, a destination ID and other proper items. Communication channel identifying information can contain, for example an output instruction part, a quality instruction part and other proper parts.

Next, a brief description of an operation of the entire network connecting device 100 will be made. Hereinafter, the connectionless transmission may be abbreviated to CL, and the connection-oriented transmission to CO when necessary.

First, the network connecting device 100 is connected to a wide area communication network such that two different kinds of transfer systems, i.e., the connectionless transmission by the packet switching system and the connection-oriented transmission by the circuit switching system or the ATM communication system, can be used.

The transfer control program section 400 decides a communication channel to be used for transferring a data packet entered to the transfer buffer section 120, to the wide area communication network. For that, the transfer control program section 100 determines whether a communication channel registered in the connection table section 200 should be used or a new communication channel should be allocated by using the channel setting control program section 500.

In the connection table section 200, among communication channels allocated to data flows previously put to use for communications, ones that have not reached time-out are registered. When a new communication channel is allocated, the channel setting control program section 500 first sends out the data packet by using a CL communication channel permanently set in the N-ISDN 170. On the other hand, the channel setting control program section 500 makes determination according to a content of setting in the priority condition table section 300 as to the following factors: which communication channel should be used through which network, and what a level of quality is needed by the communication channel. If the data packet has priority, then a CO communication channel other than the CL communication channel permanently set in the N-ISDN 170 is used as occasion demands. For this purpose, call setting control is performed by using the ATM I/F 160, and the connection table section 200 is updated so as to cause the transfer control program section 400 to make determination for use of a new communication channel. Control may be first carried out to decide which should come first, the CO or the CL without using the CL.

If a new CO communication channel cannot be allocated to the ATM I/F 160, then the channel setting control program section 500 uses the kicking-out program section 1300. This kicking-out program section 1300 refers to the connection table section 200 regarding connection set based on the priority defined beforehand in the priority part 320 in the priority condition table section 300. Based on information thereof, a communication channel satisfying a predetermined communication condition, e.g., equal communication capabilities regarding destinations, bands or quality, is used instead. This communication channel is also one of CO communication channels set in the ATM I/F 160, and is currently used by a data packet lower in priority than a data packet, to which a new communication channel is to be allocated. On the other hand, if there are no existing CO communication channels satisfying the predetermined communication condition, then a CO communication channel currently used by low-priority data packet in the priority part 320 is cut off, and a new CO communication channel is allocated. In any of the cases, for the low-priority packet data in the priority part 320, the CO communication channel permanently set in the N-ISDN I/F 170 is temporarily used.

The recovery program section 700 checks and updates a flag value in the time-out flag 240 of the connection table section 200 at every constant interval of time, and cuts off communication channels that have not been used since last checking. Also, for the data packet that has temporarily used the CL communication channel permanently set in the N-ISDN 170 because no new CO communication channels have not been allocated or because the packet has been subjected to kicking-out, the recovery program section 700 performs call setting control again by using the ATM I/F 160, and then updates the connection table section 200 so as to cause the transfer control program section 400 to make determination for use of a new communication channel.

(2) Operation of Entire Network Connecting Method

A method of selecting a channel used for transmitting/receiving can be chosen from following several methods. Description will now be made of these methods.

Figure 6:
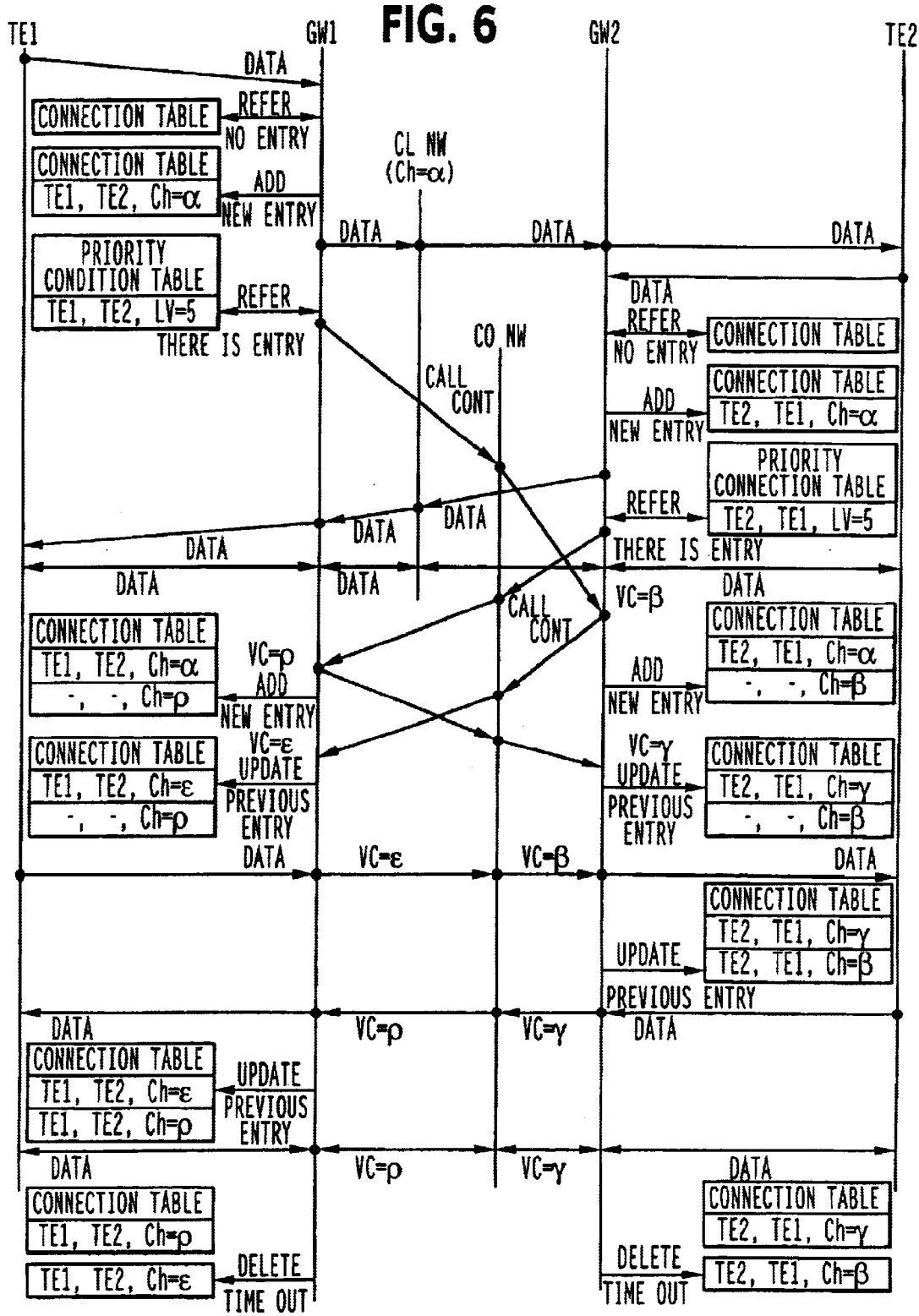
FIG. 6 is a view (1) illustrating an operational sequence at the time of connection allocation.

FIG. 6 is a view (1) illustrating an operational sequence at the time of connection allocation.

The operational sequence here represents a method of limiting information of a communication channel to be registered in the connection table 200 to a predetermined case. Specifically, a data packet transmitted through the N-ISDN I/F 170 used for a connectionless transmission as an permanently set communication channel, is registered in the connection table section 200, and a flag is updated at the time of transmitting/receiving the data packet. A communication channel of a connection-oriented transmission allocated to the ATM I/F 160 by call setting control at the time of transmitting/receiving, is registered in the connection table section 200, and a flag is updated at the time of transmitting/receiving a data packet. Any new registration may not be made in the connection table section 200 regarding a data packet to be received. Further, rules for selecting communication channels used at the time of transmitting are set to be identical between the two devices of the transmitting/receiving sides. By always selecting a channel having a smaller ID or a channel having a larger ID, communication channels different between the transmitting and receiving sides are temporarily used. Then, by performing time-out processing to cancel one of the communication channels, the same communication channel can be set between the transmitting and receiving sides.

As a modified example of the foregoing, the communication channel allocated to the ATM I/F 160 by call setting control at the time of receiving may not be registered in the connection table section 200. In this way, communication channels different between the transmitting and receiving sides can be independently selected and used.

For example, as shown, in a Terminal Equipment (TE) 1, for an entry newly added to the connection table section 200, a communication channel α of a CL network is used while a call. origination ID is TE 1 and a destination ID is a TE 2. In the priority condition table section 300, priority value 5 is referred to according to TE1, TE2. Data from TE 1 is transmitted through a GW 1, the CL network and a GW 2 to TE 2. On the other hand, in TE 2, similarly, a new entry is added to the connection table section 200 in a manner that a call origination ID is TE 2, a destination ID is TE 1 and a communication channel is α, and reference is made to the priority condition table section 300. Data from TE 2 is transmitted through GW 2, the CL network and GW 1 to TE 1. In this way, CL communications are carried out between TE 1 and TE 2. After the start of signaling performed in GW 1 for using the CO communication channel, β is allocated to VC in GW 2, and a new entry is added. On the other hand, in GW 1, a new entry of VC=ρ is added after signaling performed for using the CO communication channel. Then, previous entries that have used the channel α of the CL network are updated to VC=ε of the CO network in GW 1 and to VC=γ of the CO network in GW 2, respectively. The data from TE 1 is transmitted through GW 1, VC=ε, VC=β and GW2 to TE 2. In GW 2, the previous entry is updated in a manner that a call origination ID is TE 2, a destination ID is TE1 and a communication channel is β. On the other hand, the data from TE2 is transmitted to TE1 through GW2, VC=γ, VC=ρ and GW1. In GW 1, the previous entry is updated in a manner that a call origination ID is TE 1, a destination ID is TE 2 and a communication channel is β. Subsequently, in GW 1 and GW 2, one of the two channels is canceled and, between TE 1 and TE 2, bidirectional communications are carried out through GW 1, VC=ρ, the CO network, VC=γ and GW 2.

Figure 7:
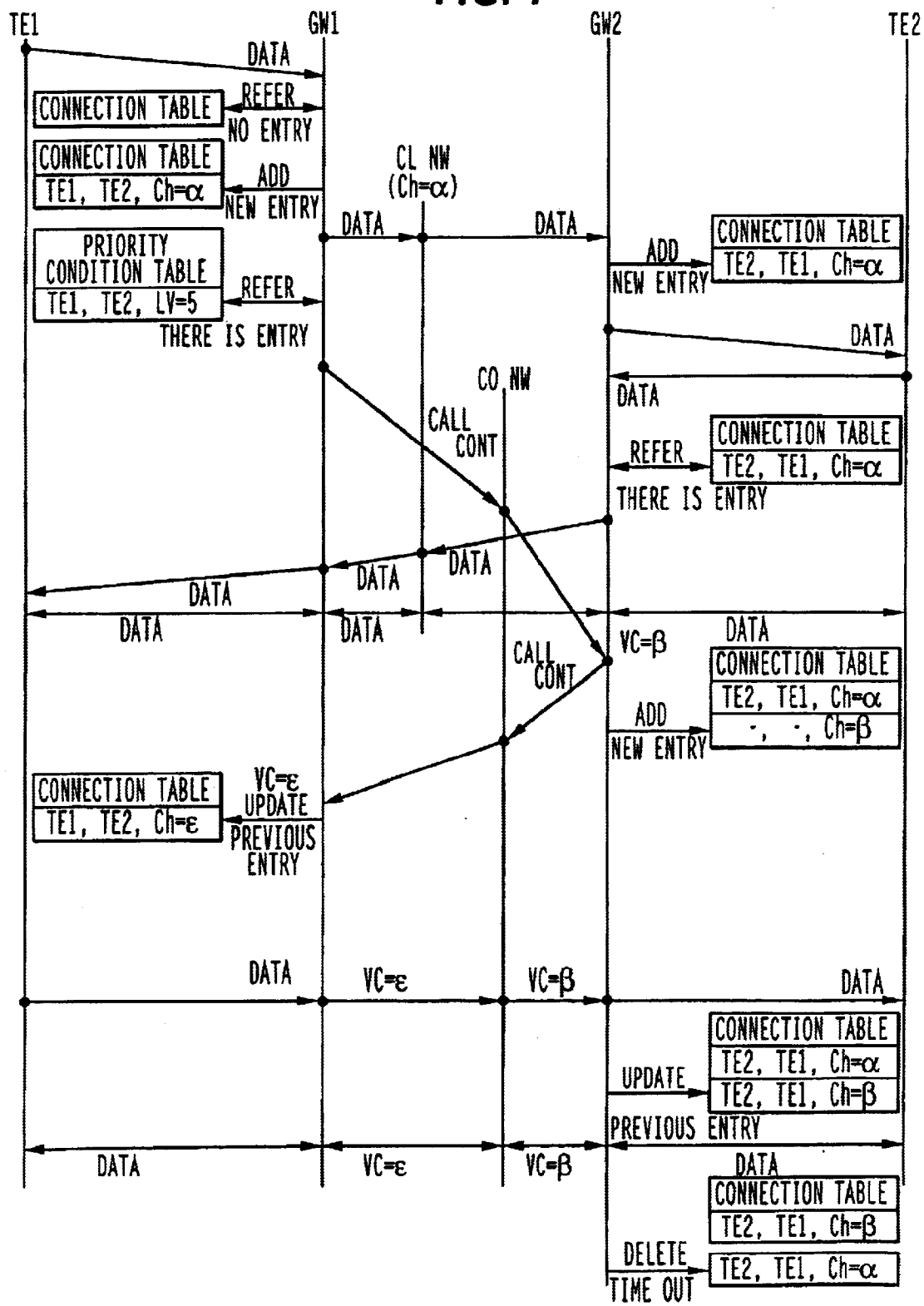
FIG. 7 is a view (2) illustrating an operational sequence at the time connection allocation.

FIG. 7 is a view (2) illustrating an operational sequence at the time of connection allocation.

In accordance with a method employed for the operational sequence here, a packet received through the N-ISDN I/F 170 is also registered in the connection table section 200. Accordingly, a chance to perform new communication channel setting is given only to the receiving side, and no communication channel setting started at the time of packet transmission for response is not performed. In this way, identical communication channels are set between the transmitting and receiving sides.

As shown, for example, in TE 1, for an entry newly added to the connection table section 200, the communication channel α of the CL network is used while a call origination ID is TE 1 and a destination ID is TE 2. In the priority condition table section 300, reference is made to a priority value 5 for TE 1 and TE 2. Data from TE 1 is transmitted through GW 1, the CL network and GW 2 to TE 2. On the other hand, in TE 2, similarly, a new entry is added to the connection table section 200 in a manner that a call origination ID is TE 2, a destination ID is TE 1 and a communication channel is α. Data from TE 2 is transmitted through GW 2, the CL network and GW 1 to TE 1. In this way, CL communications are carried out between TE 1 and TE 2. Then, in GW 1, after the start of signaling performed in GW 1 for using the CO communication channel, β is allocated to VC in GW 2, and a new entry is added. On the other hand, in GW 1, the previous entry is updated to VC=ε that uses the CO communication channel. The data from TE is transmitted through GW 1, VC=ε, the CO network, VC=β and GW2 to TE 2. In GW 2, the previous entry is updated in a manner that a call origination ID is TE 2, a destination ID is TE 1 and a communication channel is β. Subsequently, in GW 2, one of the two channels is canceled and, between TE 1 and TE 2, bidirectional communications are carried out through GW 1, VC=ε, the CO network, VC=β and GW 2.

As yet another method, if asymmetrical VC setting is allowed as in the case of the ATM communication system, by specifying a band used only for the transmitting side and setting the receiving side to 0, a communication channel allocated to the ATM I/F 160 by call setting control at the time of transmitting may be registered in the connection table section 200, and a flag can be updated at the time of transmitting a data packet. Also, a communication channel allocated to the ATM I/F 160 by call setting control performed at the time of receiving may not be registered in the connection table section 200. Accordingly, communication channels different between the transmitting and receiving sides can be independently selected and used.

Next, description will be made of operations and a control method for individual sections as features of the invention.

Figure 8:
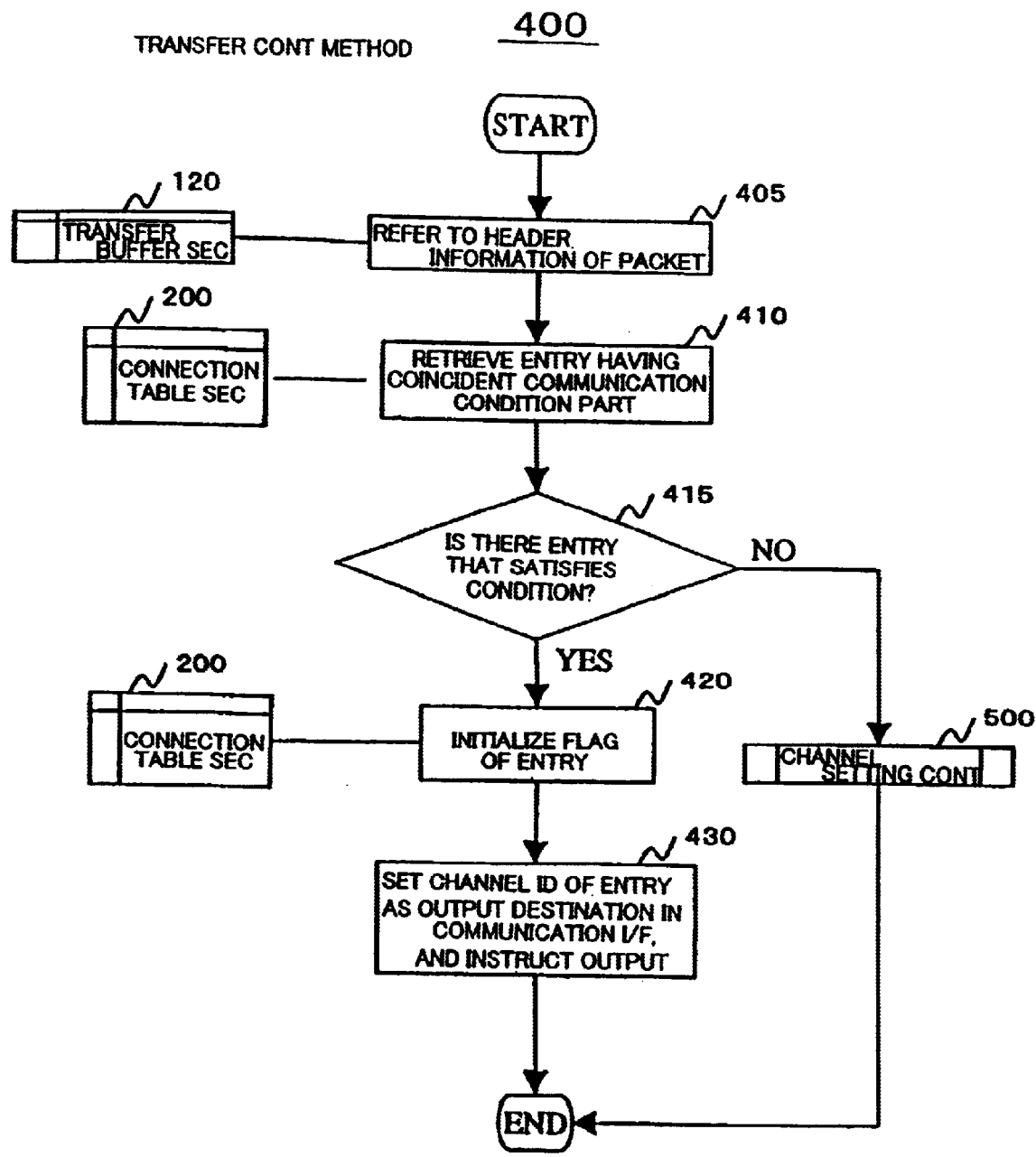
FIG. 8 is a flowchart showing transfer control performed by a transfer control program section 400.

FIG. 8 is a flowchart showing transfer control performed by the transfer control program section 400. The drawing shows processing in the means of the transfer control program section 400 for transferring a data packet. Specific processing of the flowchart is described below.

First, the transfer control program section 400 refers to protocol control information of a data packet received through the LAN I/F 130 and stored in the transfer buffer part 120 (405). For example, if a protocol used on the LAN 195 is TCP/IP, as protocol control information, the section 400 can refer to information such as IP addresses of call origination and destination sides, a TCP port number, a value of a Type of Service field or the like.

Then, the transfer control program section 400 collates information of the data packet stored in the transfer buffer part 120 with the communication data condition part 210 of the connection table section 200, and retrieves an entry that has a coincident communication condition (410). Then, among communication channels recognized to be currently used by the present device, verification is made as to existence of channels of entries that satisfy the communication condition of the data packet (415). In this case, by properly setting or changing valid portions of the communication condition data part 210 of the connection table section 200, communication channels to be used can be minutely allocated for respective purposes. For example, only one communication channel may be specified between predetermined terminals by using only the IP addresses of the call origination and destination sides. By also using a port number and a Type of Service value, a plurality of communication channels can be allocated between predetermined terminals in a divided manner depending on application varieties, such as degrees of emergency or service types.

In the priority condition table section 300, to allocate communication channels in a divided manner, a mask value is set in the condition part 310. When connection of a data packet needing priority processing is registered in the connection table section 200, a portion to be registered is instructed to the communication data condition part 210 by using this mask value. The mask value is defined, for example, by setting correspondence among bits in the parameter order of protocol control information. For example, if a value is 1, it is valid, and if 0, it is invalid. Only a parameter of the protocol control information equivalent to a valid portion can be registered in the communication data condition part 210, and an invalid portion can be a wild card which permits any values. By setting such a mask value, definition of the priority condition table section 300 can be simplified. For example, there may be a case where even if priorities and capabilities of communications to particular identical destinations are the same, connections are individually made for different call originating terminals or application varieties. In such a case, if the mask value is not used, conditions for separately using individual connections must be registered as separate entries. On the other hand, if the mask value is used, one entry clarifying only a destination condition is registered in the condition part 310, and the mask value only needs to indicate a combination of valid portions including a call origination side, a destination side, an application ID, a destination, and so on.

In step 415, if there are no entries that satisfy the condition, then the control processing is transferred to the channel setting control program section 500. In step 415, if there is an entry that satisfies the condition, then a time-out flag 240 in the connection table section 200 regarding an item satisfying the condition is initialized to be False (currently used). Then, an I/F and its communication channel to be used for transmission to the wide area communication network are selected by means of a value shown in the output instruction part 220 regarding the entry satisfying the condition, and the I/F is instructed to perform transmission (430).

The time-out flag 240 at this time can be identified by using 1 Bit, for example while setting a value indicating False (currently used) to 1 and a value indicating True (not used, time-out) to 0. In this case, a timer set value for performing time-out processing enables the same time-out to be set for all the connections. If different time-out is used for each connection, a time-out value 340 is set for each entry in the priority condition table section 300. When connection for the data packet needing priority processing is registered in the connection table section 200, the time-out value 340 is registered as an initial value for the time-out flag 240. This initial value is a positive integer, 1 is subtracted from the initial value for each time-out processing and, when the value becomes 0, the connection of the entry is determined to have reached time-out. In this way, for a plurality of connections, different time-out points can be managed by one timer.

In the case of receiving through the wide area communication network I/F, if there is a difference in the using purposes of the transmitting/ receiving channels like that mentioned above in the brief description of the operation, there may also be difference in registration in the connection table section 200 or updating of the time-out flag 240. In a case where one and the same communication channel is used between the transmitting and receiving side at the end by temporarily using different channels therebetween, if an entry satisfying the communication condition exists in step 415, then the time-out flag 240 is initialized to be False (currently used). This similarly applies to cases where receiving is made from the N-ISDN I/F 170 as a permanently set communication channel for a connectionless transmission, and receiving is made from the ATM I/F 160 as a communication channel for a connection-oriented transmission, which is used in a separated manner for each purpose.

A new entry is added to the connection table section 200, only when a signaling operation is performed, for example. This method can be used if use of a plurality of communication channels is allowed on one communication line like the ATM, the frame relay or the N-ISDN as a connection-oriented transmission network. There may be a case where use of only one communication channel is allowed on one communication line like an analog telephone line, or no extra channels are used. In such a case, different from the foregoing procedure, a new additional entry is registered in the connection table section 200 even if receiving is made through the communication channel for a connectionless transmission, and the time-out flag 240 is initialized at the time of transmitting/receiving all the data packets.

If use of an asymmetrical communication channel is allowed and different communication channels are used between the transmitting and receiving sides as in the case of the ATM, regarding a communication channel allocated to the ATM I/F 160 by call setting control performed at the time of transmission, a band to use only the transmitting side is specified, and the receiving side is set to 0. Further, at the time of performing a transmitting operation, any transmissions to the N-ISDN I/F 170 and the ATM I/F 160 are registered in the connection table section 200, and the time-out flag 240 is initialized at the time of transmitting the data packet. At the time of performing a receiving operation, no registrations, references or updating are carried out in the connection table section 200.

Figure 9:
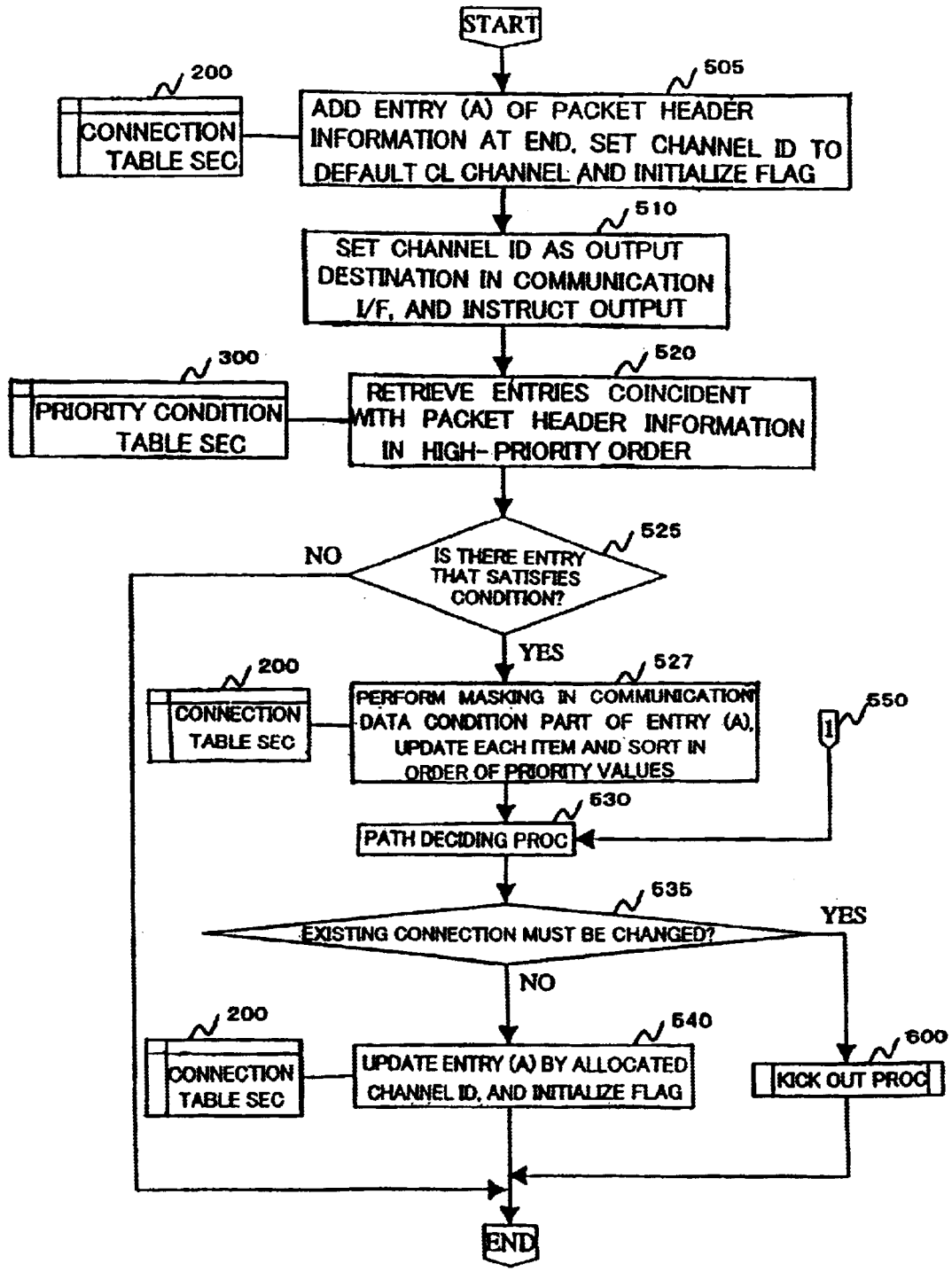
FIG. 9 is a flowchart showing communication channel setting control performed by a channel setting control program section 500.

FIG. 9 is a flowchart showing setting control for a communication channel performed by the channel setting control program section 500. This drawing shows a method of performing communication channel setting control by the channel setting control program section 500 (see FIGS. 3 and 8), which is used for transferring a data packet in the means for deciding a communication channel. Specific processing of the flowchart is described below.

First, if it is necessary to allocate a new particular communication channel for transmission of a data packet from the LAN 195 to the wide area communication network, the channel setting control program section 500 transmits the data packet through the permanently set CL communication channel using the N-ISDN I/F 170. Thus, a new entry (A) is added to the end of the communication table section 200. In this case, protocol control information of the data packet is recorded in the communication data condition part 210, identification information indicating the N-ISDN I/F 170 as an I/F to be used and identification information indicating the communication channel are recorded in the output instruction part 220, and the time-out flag 240 is initialized (505). Then, the communication channel to be used and the data packet to be transmitted are specified to the N-ISDN I/F 170, and outputting is instructed (510). Then, based on the protocol control information recorded in the connection table section 200 and by referring to the condition part 310 of the priority condition table section 300, an entry equivalent to header information of each of data packets to be transmitted in the priority order is retrieved (520). Then, verification is made as to existence of an entry that satisfies the condition, and whether channel setting is continued or not is determined (525). The processing is terminated if no entries that satisfy the condition are found.

In step 525, if an entry that satisfies the condition is found, then the channel setting control program section 500 continues channel setting, by determining that it is necessary to allocate a particular communication channel. In this case, in accordance with the mask value in the condition part 310 of the priority table section 300, an invalid portion of the communication data condition part 210 of an entry (A) newly added to the connection table section 200 is set as a wild card. Then, a priority value of the priority part 320 is registered as a sorting key 250 of the connection table section 200, and the quality instruction part 230 is updated based on a value of the quality instruction part 330 of the priority table section 300. Here, the entries of the connection table section 200 are sorted in the priority order by the sorting key 250 (527). Further, if the processing is continued, path deciding processing is successively carried out (530).

To know an address to be connected on the wide area communication network, a table for recording correspondence between network addresses used on the LAN and network addresses used on the wide area communication network may be prepared beforehand and used for reference. Also, the information can be obtained by making an inquiry to a server provided with a function for address conversion outside the device. For this purpose, an information item for setting correspondence among network addresses used for the wide area communication network can be added to the priority condition table section 300. Further, to specified communication quality, information in the quality instruction part 330 may be referred to from the priority condition table section 300. In this case, as the information of the quality instruction part 330, parameters such as a used band, a delay condition or the like may be directly recorded. Alternatively, a quality condition may be profiled and used as an index for a content recorded in another separately prepared table. Otherwise, an inquiry may be made to another server device provided with a database function.

In step 535, by judging success of the allocation of the new communication channel, determination is made as to necessity of changing the existing connection. If the allocation of the new communication channel fails, to change the existing connection, control is transferred to the kicking-out program section 1300 (600), and the processing is terminated. If the allocation of the new communication channel succeeds, information of the output instruction part 220 is updated based on information indicating a new I/F to be used, a communication channel and a used address, and then the time-out flag 240 is initialized (540).

In the above case, to the sorting key 250, a value 0 is allocated in the case of non-priority, an integer value of 1 or higher is allocated in the case of priority, and larger values are allocated as priority is higher. Then, by performing sorting in the order of large values, arrangement can be made in the order of information of communication channels used for high-priority data communications.

(3) Kicking-out

Next, description will be made of a kicking-out operation, wherein communication channels used by relatively low-priority communication data are made to be available for subsequent relatively high-priority communication data. In other words, if the allocation of the new particular communication channel fails in FIG. 9, the kicking-out operation is performed to enable a particular CO communication channel to be allocated for relatively high-priority data- communications by temporarily changing the CO communication channel to the permanently set CL communication channel that uses the N-ISDN I/F 170 for the relatively low-priority data communications. A specific operation is described below by referring to the flowchart.

Figure 10:
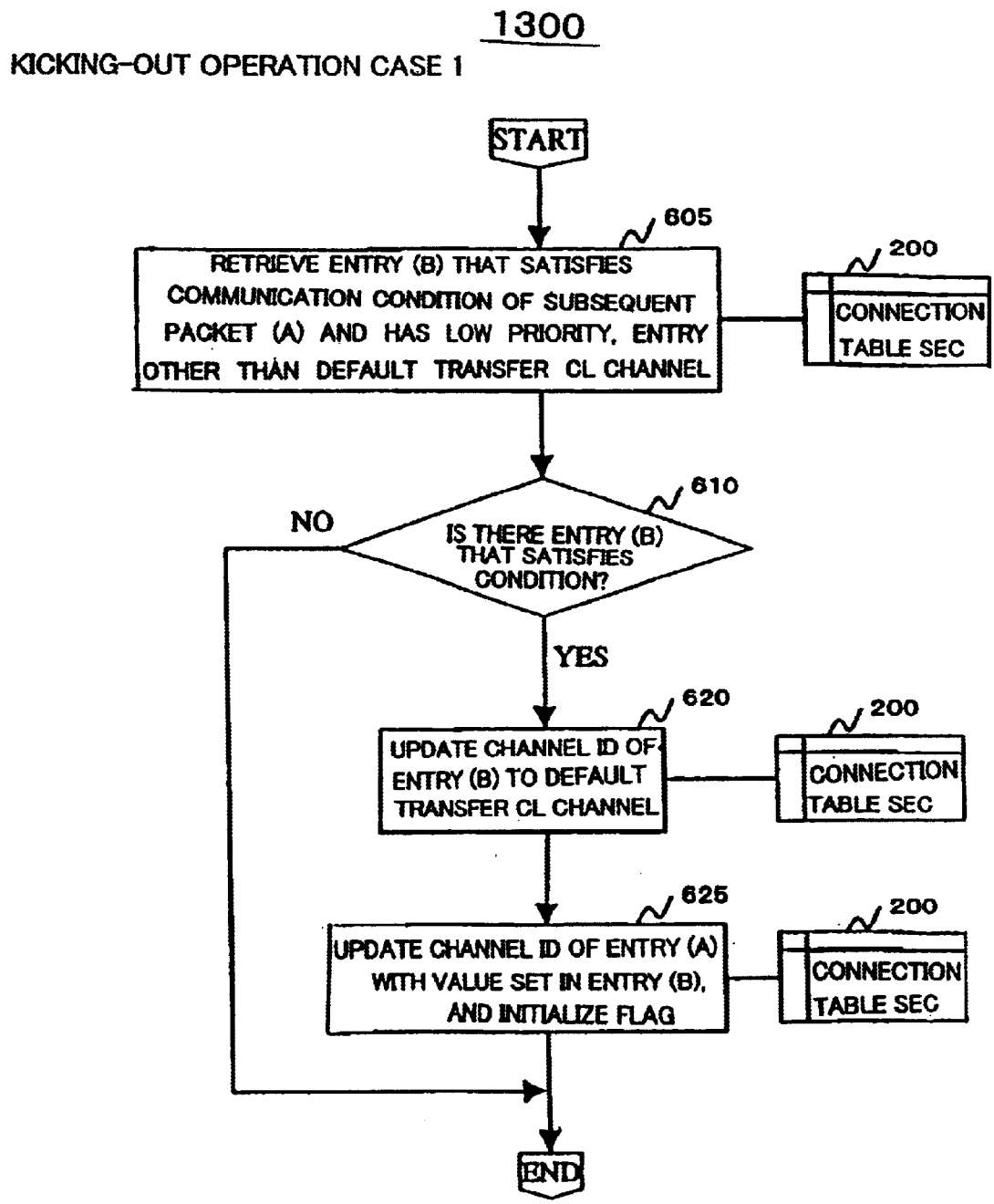
FIG. 10 is a flowchart showing a first pattern in a kicking-out program section 1300.

FIG. 10 is a flowchart showing a first pattern in the kicking-but program section 1300. In FIG. 10, to select items to be kicked out, first, reference is made to entries of the connection table section 200 in the low-priority order. Then, among the entries using channels other then the permanently set CL communication channel, retrieval is performed to find entries that satisfy communication conditions such as protocol control information of data packets as targets for communication channel allocation, required communication capabilities or the like (605). Determination is made as to existence of entries that satisfy such communication conditions (610). If no entries of the existing connections that satisfy the conditions are found, then current allocation processing is cancelled (610).

If there is an entry that satisfies the condition, then to change the CO communication channel currently used for low-priority data communications to a CL communication channel, the output instruction part 220 of the connection table section 200 is changed (620). In this case, for example, updating is made to a CL channel for a default transfer. Then, the channel used by a high-priority data packet, to which a CO communication channel is to be allocated, is changed to the communication channel that has been used for the relatively low-priority data, by changing the output instruction part 220 of the connection table section 200, and initializing the time-out flag 240. In this case, the output instruction part 220 is updated to a value of the output instruction part that has been used for the low-priority data communications, and items of the connection table section 200 are sorted in the high-priority order by the sorting key 250 (625).

Figure 11:
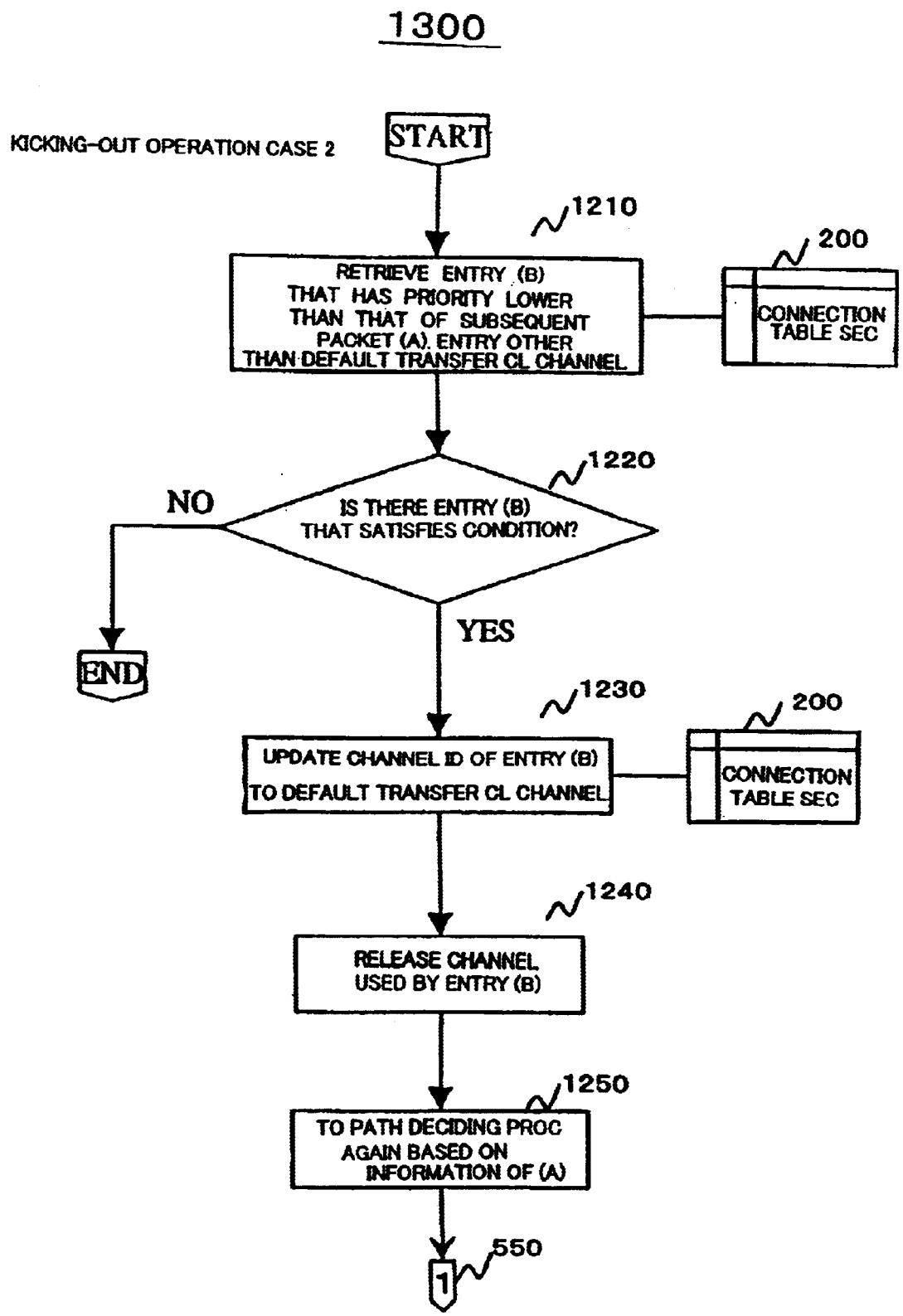
FIG. 11 is a flowchart showing a second pattern in the kicking-out program section 1300.

FIG. 11 is a flowchart showing a second pattern in the kicking-out program section 1300. In FIG. 11, reference is made to entries of the connection table section 200 in the low-priority order. Then, irrespective of communication conditions, among the entries that use channels other than the CL communication channel, retrieval is performed to obtain entries lower in priority than a high-priority data packet as a target for allocation of a communication channel (1210). Then, determination is made as to existence of entries that satisfy the conditions (1220). If there are no entries that satisfy the conditions, current allocation processing is cancelled, and the processing is terminated. On the other hand, in step 1220, if there is an entry that satisfies the condition, to change the CO communication channel that has been used for the low-priority data to a CL communication channel, the output instruction part 220 of the connection table section 200 is changed (120). In this case, for example, a channel ID of the output instruction part 220 is updated to a default transfer CL channel. Then, the connection of the communication channel that has been used for the low-priority data is cut off (1240). Based on the information of the high-priority data packet as a target for allocation of a communication channel, the processing moves to terminal 550 in FIG. 9, where new path deciding processing 530 is performed (1250).

Figure 12:
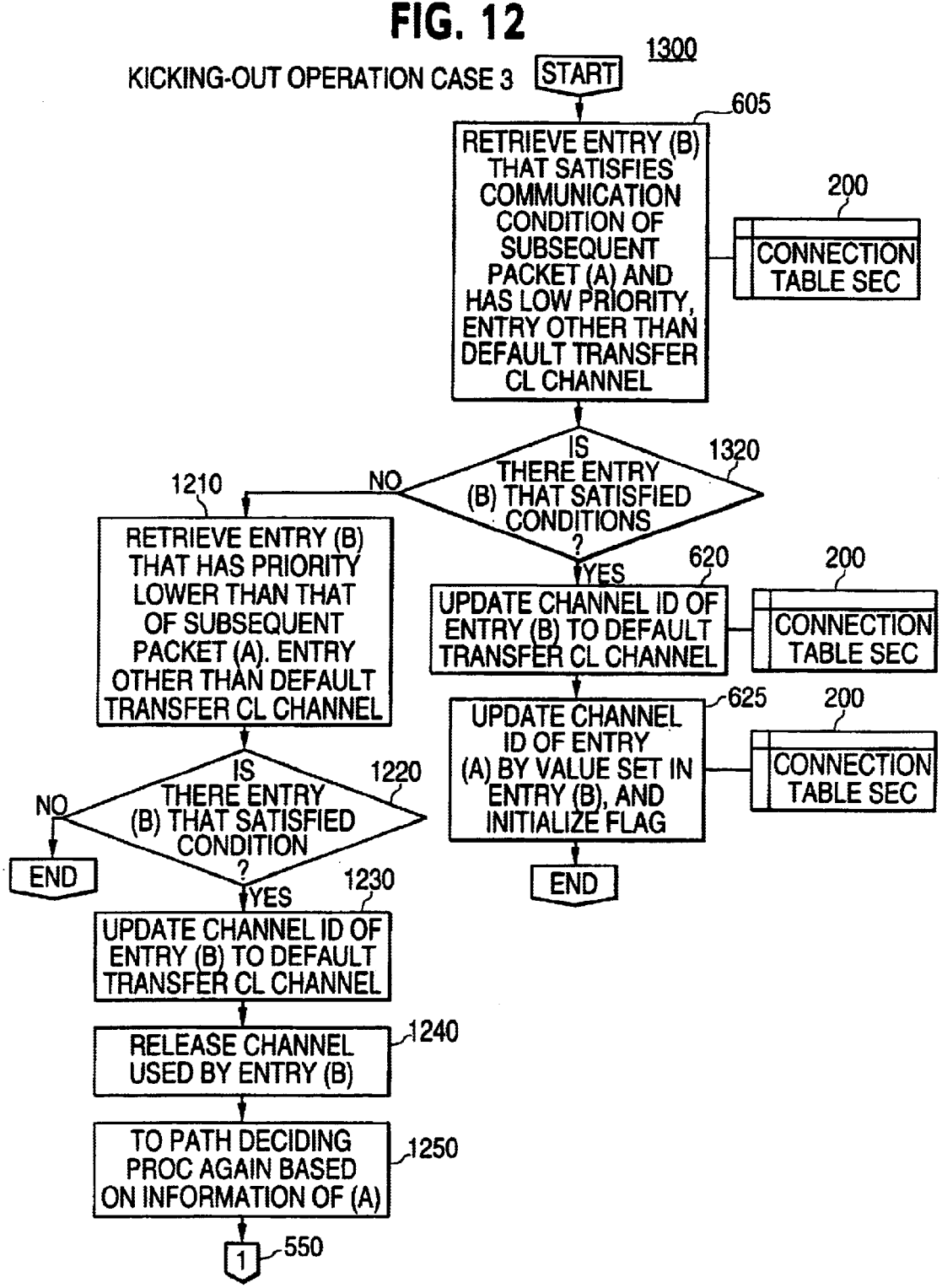
FIG. 12 is a flowchart showing a third pattern in the kicking-out program section 1300.

FIG. 12 is a flowchart showing a third pattern in the kicking-out program section 1300.

To select a target to be kicked out, first, reference is made to entries of the connection table section 200 in the low-priority order. Then, among the entries that use channels other than the permanently set CL communication channel, retrieval is performed to choose entries that satisfy communication conditions such as protocol control information of a data packet as a target for allocation of a communication channel, required communication capabilities or the like (605). Determination is made as to existence of entries that satisfy such communication conditions (1320). If no entries of the existing connection that satisfy the conditions are found, then the process moves to step 1210 (for details, see FIG. 11 and the description thereof). In step 1320, if there is an entry that satisfies the condition, then, the process moves to step 620 and processing thereafter described above with reference to FIG. 10 (for details, see FIG. 10 and the description thereof).

To perform kicking-out, without reusing the existing connection that satisfies the condition, a target entry may be selected based on degrees of priority, and then connection may be cut off. Further, for selection of the foregoing three patterns, any one of them may be used in a fixed manner. Also, depending on priority of a target packet, since priority is placed on processing efficiency, for example, if priority is very high, cutting without reusing (see the flowchart of FIG. 11) may be selected. If priority is low, reusing (see the flowcharts of FIGS. 10 and 12) may be tried. Alternatively, in accordance with a load of the device, reusing (see the flowcharts of FIGS. 10 and 12) may be tried if a load is light. If a load is heavy, then cutting (see the flowchart of FIG. 11) may be selected.

Different from the kicking-out operation started by cal setting control, a kicking-out operation may be started upon receiving congestion information from the network side. In this case, for example, reference may be made to the output instruction part 220 in the low-priority order of entries of the connection table section 200, entries that use the communication channel, a congestion state of which has been notified, or the communication I/F, may be retrieved. Then, the channel used by the retrieved entries may be temporarily changed to the CL communication channel permanently set in the N-ISDN I/F 170.

(4) Recovery

Figure 13:
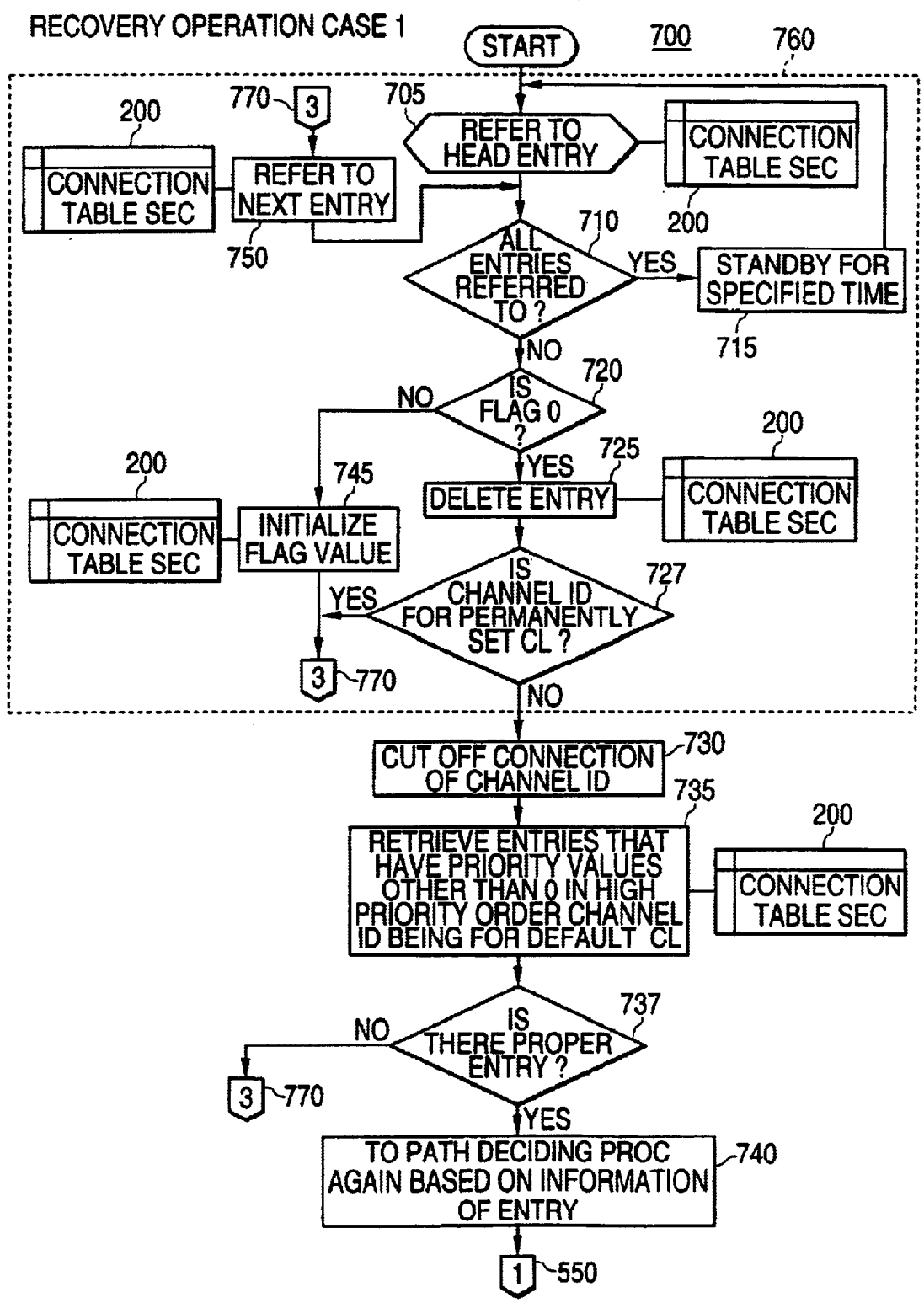
FIG. 13 is a flowchart (1) showing communication channel reallocation performed in a recovery program section 700.

FIG. 13 is a flowchart (1) showing communication channel reallocation performed in the recovery program section 700. The drawing shows a method of reallocating a particular communication channel to communication data where a communication channel has been temporarily made available for relatively high-priority communication data. Specific processing of the flowchart is described below.

Processing shown in FIG. 13 is independent from other processing. For example, the processing is started at every. constant interval of time and, by cutting off a communication channel determined to be currently in nonuse or by the kicking-out program section 1300, a CO communication channel is reallocated to an entry that has temporarily changed a communication channel to be used.

First, time-out processing 760 is described. Here, reference is made to the output instruction part 220 and the time-out flag 240 in order from a head of the connection table section 200 (705), and then determination is made as to completion of reference to all the entries (710). In step 710, if completion of reference to all the entries beyond the last of the table is determined, then the processing is interrupted for a fixed period of time (715), and new execution of the recovery program section 700 is started.

On the other hand, in step 710, if some entries remain to be referred to, determination is made as to whether the entries have reached time-out or not. This determination is carried out on the basis of, for example, whether the time-out flag 240 is "0" or not (720). If the entry has not reached time-out, in other words, the time-out flag 140 for the entry is other than 0, then, the time-out flag is updated (745), and processing of a next entry of the connection table section 200 is continued (750).

In step 720, if the entry has reached time-out, in other words, the time-out flag 240 for the entry is 0, then the entry is deleted from the connection table section 200 (725). Then, determination is made as to whether a value indicated by the output instruction part 220 has been for using the permanently set CL communication channel or not (727). Here, if the value indicated by the output instruction part 220 regarding the entry that has reached time-out is for using the CL communication channel permanently set in the N-ISDN I/F 170, then processing for a next entry of the connection table part 200 is continued (750).

While the foregoing time-out processing 760 is continued, if the connection that has reached time-out is for using a particular CO communication channel set in the ATM I/F 160 or the like, then the connection of the CO communication channel is cut off (730). Then, reference is made to entries of the connection table section 200 in the high-priority order, and retrieval is performed to choose an entry where a value of the sorting key 250 indicating a priority value is other than 0, and a value indicated by the output instruction part 220 is for a default CL communication channel set in the N-ISDN I/F 170 (735). Determination is made as to existence of a target entry (737). If there is a target entry, then, path deciding processing is started for allocating a new particular CO communication channel on the ATM I/F 160 (740). This allocation is carried out based on information of the communication data condition part 210 and the quality instruction part 230 for the target entry. In this way, the entry that has temporarily used the CL communication channel can be recovered to use the CO communication channel. If there are not target entries, then the process returns to step 570, and processing for a next entry of the connection table section 200 is continued (750).

Figure 14:
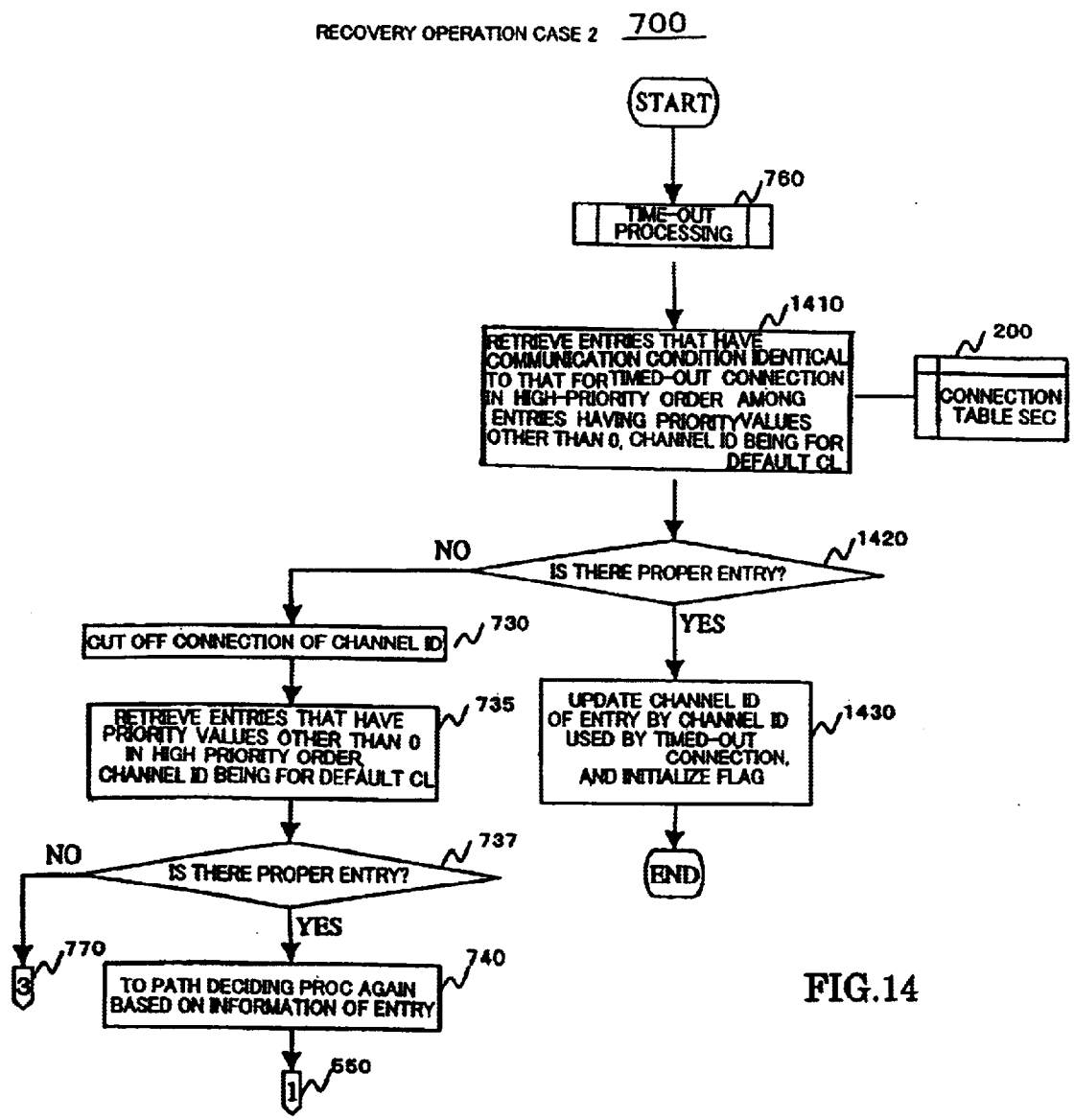
FIG. 14 is a flowchart (2) showing communication channel reallocation performed in the recovery program section 700.

FIG. 14 is a flowchart (2) showing communication channel allocation performed in the recovery program section 700.

In the flowchart of FIG. 13, to perform recovery processing in the recovery program section 700, the connection was cut off immediately after the foregoing execution of the time-out processing 760. But instead of making immediate cut-off, processing like that shown in FIG. 14 may be performed. Specifically, after the time-out processing 760, reference is made to items of the connection table section 200 in the high-priority order. Among the items where a value of the sorting key 250 indicating a priority value is other than 0, and a value indicated by the output instruction part 220 is for a default CL communication channel set in the N-ISDN I/F 170, retrieval is performed to find entries that satisfy communication conditions such as protocol control information indicated by the communication data condition part 210 of the connection that has reached time-out, a band or communication capabilities such as a traffic characteristic indicated by the quality instruction part 230 (1410). Then, determination is made as to existence of entries that satisfy the conditions (1420). If there is an entry that satisfies the condition, then, a value of the output instruction part 220 regarding the entry is updated by using a value of the output instruction part 220 of the connection that has reached time-out, and the time-out flag 240 is initialized (1430). If there are no entries that satisfy the conditions, cutting-off is executed (780) and processing of step 730 and thereafter, which described above with reference to FIG. 13, is carried out.

For selection of either one of the two processing patterns shown in FIGS. 13 and 14, one of them may be selected beforehand in a fixed manner. Alternatively, selection may be made depending on a load state of the device. For example, if a load is light, reuse may be tried like that shown in FIG. 14. If a load is heavy, immediate cutting-off may be selected like that shown in FIG. 13.

What is claimed is:

1. A network connecting method in a network connecting device, said network connecting device including:

first communicating means for performing communications with a first communication network such as a wide area network, connectionless (CL) communicating means for performing a CL transmission with a second communication network, and connection-oriented (CO) communicating means for performing a CO transmission with a third communication network, said network connecting method comprising the steps of:

storing in first storing means at least a part of protocol control information and communication channel identifying information in a corresponding relationship, the protocol control information being of data on the first communication network, and the communication channel identifying information being for identifying a communication channel with a second, alternatively third wide area communication network, and performing channel control for changing an entry having said communication channel identifying information which indicates the CO communicating means as an entry having communication channel identifying information which indicates the CL communicating means, by referring to the communication channel identifying information held in the first storing means.

2. A network connecting method according to claim 1, wherein said channel control includes the steps of:

adding at least a part of protocol control information of a data packet on the first communication network as new first entry to the first storing means, and setting communication channel identifying information of the first entry to be one for using the CL communicating means;

changing a second entry to one indicating the CL communicating means, the second entry being an entry held in the first storing means and channel information thereof indicating the CO communicating means;

releasing a communication channel of the CO communicating means indicated by communication channel identifying information held by the second entry, the communicating means thereof having been changed; and changing the communication channel identifying information of the first entry newly added to the first storing means to one for indicating the CO communicating means.

3. A network connecting method according to claim 1, wherein said channel control includes the steps of:

adding at least a part of protocol control information of a data packet on the first communication network as a new first entry to the first storing means, and setting communication channel identifying information of the first entry to be one for using the CL communicating means;

selecting a second entry, among entries which are held in the first storing means and whose communication channel identifying information use the CO communicating means, second entry which has information indicating at least a part of protocol control information identical to that of the first entry newly added to the first storing means;

changing communication channel identifying information of the selected second entry to one for using the CL communicating means; and updating the communication channel identifying information of the first entry newly added to the first storing means based on communication channel identifying information indicating the CO communicating means, which has been held by the second entry, the communicating means thereof being changed.

4. A network connecting method according to claim 1, further comprising the step of storing at least a part of the protocol control information of data on the first communication network and priority information indicating priority in a corresponding relationship in second storing means, wherein said channel control further includes the step of setting, changing, releasing, otherwise deleting entries held by the first storing means, by referring to the second storing means and selecting entries having communication channel identifying information in sequence indicated by order information.

5. A network connecting method in a network connecting device, said network connecting device including:

first communicating means for performing communications with a first communication network such as a local area network, connectionless (CL) communicating means for performing a CL transmission with a second communication networks, and connection-oriented (CO) communicating means for performing a CO transmission with a third communication network, said network connecting method comprising the steps of:

storing in first storing means at least a part of protocol control information and communication channel identifying information in a corresponding relationship, the protocol control information being of data on the first communication network, and the communication channel identifying information being for identifying a communication channel with a second, alternatively third wide area communication network, and performing channel control for recovering an entry having communication channel identifying information which indicates the CL communicating means as a entry having communication channel identifying information which indicates the CO communication means, by referring to the communication channel identifying information held in the first storing means.

6. A network connecting method according to claim 5, wherein said channel control includes the steps of:

deleting a first entry, which is an entry held by the first storing means and has communication channel identifying information indicating the CO communicating means;

releasing a communication channel indicated by the communication channel identifying information of the deleted first entry;

selecting a second entry, which is an entry held by the first storing means and has communication channel identifying information indicating the CL communicating means;

setting a communication channel to be used by the CO communicating means based on information indicating at least a part of protocol information of the second entry; and updating the communication channel identifying information of the second entry to one indicating the CO communicating means.

7. A network connecting method according to claim 5, wherein said channel control includes the steps of:
   deleting a first entry, which is an entry held by the first storing means and has communication channel identifying information indicating the CO communicating means;
   selecting a second entry among entries which have communication channel identifying information indicating the CL communicating means, the second entry having at least a part of protocol control information which is identical to that for the deleted first entry; and
   updating the communication channel identifying information of the selected second entry indicating the CL communicating means to communication channel identifying information which indicates the CO communicating means of the deleted first entry.

8. A network connecting method according to claim 5, further comprising the step of storing at least a part of the protocol control information of data on the first communication network and priority information indicating priority in second storing means in a corresponding relationship,
   wherein said channel control further includes the step of setting, changing, releasing, otherwise deleting entries held by the first storing means by referring to the second storing means and selecting entries having communication channel identifying information in sequence indicated by order information.

9. A network connecting device comprising:
   first communicating means for performing communications with a first communication network such as a wide area network; connectionless (CL) communicating means for performing CL transmission with a second communication network; connection-oriented (CO) communicating means for performing a CO transmission with a third communication network;
   first storing means for storing at least a part of protocol control information and communication channel identifying information in a corresponding relationship, the protocol control information being of data on the first communication network, and the communication channel identifying information being for identifying a communication channel with a second, alternatively third wide area communication network; and
   channel control means for changing an entry, which has communication channel identifying information indicating the CO communicating means as a second entry, which has communication channel identifying information indicating the CL communicating means, by referring to the communication channel identifying information held in the first storing means.

10. A network connecting device according to claim 9, wherein said channel control means includes:
    means for adding at least a part of protocol control information of a data packet on the first communication network as a new first entry to the first storing means, and setting communication channel information of the first entry to one for using the CO communicating means;
    means for changing the second entry to one for indicating the CL communicating means, the second entry being an entry to be held in the first storing means and communication channel identifying information thereof indicating the CO communicating means;
    means for releasing a communication channel of the CO communicating means indicated by the communication channel identifying information, which has been held by the second entry, communicating means thereof having been changed; and
    means for changing the communication channel identifying information of the first entry newly added to the first storing means to one for indicating the CO communicating means.

11. A network connecting device according to claim 9, wherein said channel control means includes:
    means for adding at least a part of protocol control information of a data packet on the first communication network as a new first entry to the first storing means, and setting communication channel identifying information of the first entry to one for using the CL communicating means;
    means for selecting a second entry among entries which are held in the first storing means and whose communication channel identifying information indicate the CO communicating means, the second entry which has information indicating at least a part of protocol control information identical to that of the first entry newly added to the first storing means;
    means for changing communication channel identifying information of the selected second entry to one for using the CL communicating means; and
    means for updating the communication channel identifying information of the first entry newly added to the first storing means based on the communication channel identifying information indicating the CO communicating means, which has been held by the second entry, communicating means thereof having been changed.

12. A network connecting device according to claim 9, further comprising second storing means for storing at least a part of protocol control information and priority information in a corresponding relationship, the protocol control information being of data on the first communication network, and the priority information indicating priority,
    wherein said channel control means for setting, changing, releasing, otherwise deleting entries held by the first storing means by referring to the second storing means and selecting entries having communication channel identifying information in sequence indicated by order information.

13. A network connecting device comprising:
    first communicating means for performing communications with a first communication network such as a wide area network;
    connectionless (CL) communicating means for performing a CL transmission with a second communication network;
    connection-oriented (CO) communicating means for performing a CO transmission with a third communication network;
    first storing means for holding at least a part of protocol control information and communication channel identifying
    information in a corresponding relationship, the protocol control information being of data on the first communication network, and the communication channel identifying information being for identifying a communication channel with a second, alternatively third wide area network; and channel control means for recovering an entry, which has communication channel identifying information indicating the CL communicating means, as an entry which has communication channel identifying information indicating the CO communicating means, by referring to the communication channel identifying information held in the first storing means.

14. A network connecting device according to claim 13, wherein said channel control means includes:
means for deleting a first entry, which is an entry to be held by the first storing means and as communication channel identifying information indicating the CO communicating means;
means for releasing a communication channel indicated by the communication channel identifying information of the deleted first entry;
means for selecting a second entry, which is an entry to be held by the first storing means and has communication channel identifying information indicating the CL communicating means;
means for setting a communication channel to be used by the CO communicating means based on information indicating at least a part of protocol control information of the second entry; and
means for updating the communication channel identifying information of the second entry to one for indicating the CO communicating means.

15. A network connecting device according to claim 13, wherein said channel control means includes:
means for deleting a first entry, which is an entry to be held by the first storing means and has communication channel identifying information indicating the CO communicating means;
means for selecting a second entry among entries which have communication channel identifying information indicating the CL communicating means, the second entry having at least a part of protocol control information, which is identical to that of the deleted first entry; and
means for updating the communication channel identifying information of the selected second entry, which indicates the CL communicating means, to communication channel identifying information of the deleted first entry which indicates the CO communicating means.

16. A network connecting device according to claim 13, further comprising second storing means for storing at least a part of the protocol control information and priority information in a corresponding relationship, the protocol control information being of data on the first communication network, and the priority data indicating priority,
wherein said channel control means for setting, changing, releasing, otherwise deleting entries held by the first storing means by referring to the second storing means and selecting entries having communication channel identifying information in sequence indicated by order information.

17. A network connecting device comprising:
first communicating means for performing communications with a first communication network such as a local area network;
connectionless (CL) communicating means for performing a CL transmission with a second communication network;
connection-oriented (CO) communicating means for performing a CO transmission with a third communication network;
first storing means for holding at least a part of protocol control information and communication channel identifying information in a corresponding relationship, the protocol control information being of data on the first communication network, and the communication channel identifying information being used by the CL and CO communicating means;
second storing means for holding the at least a part of protocol control information and sequence information in a corresponding relationship, the protocol control information being of data on the first communication network, and the sequence information for sequencing;
channel setting control means for adding a new first entry containing at least a part pf the protocol control information of data on the first communication network to the first storing means, and updating communication channel identifying information of the first entry to one for using the CL communicating means; and
kicking-out means for deciding, among entries using the CO communicating means, an entry to be changed to one for using the CL communicating means by referring to at least a part of protocol control information of a data packet held in the first storing means and the sequence information held in the second storing means, and then updating the communication channel identifying information held in the first storing means to indicate the CL communicating means for the decided entry.

18. A network connecting device according to claim 17, further comprising recovering means for selecting, among entries held in the first storing means, one entry from those which have communication channel identifying information indicating the CO communicating means, and one entry from those which have communication channel identifying information indicating the CL communicating means, and switching and updating the communication channel identifying information of the two entries.

19. A network connecting device according to claim 17, further comprising recovering means for selecting, among entries held in the first storing means, one entry from those which have communication channel identifying information indicating the CL communicating means, and one entry from those which have the same connection destination of a communication channel and communication channel identifying information indicating a unused state, and then switching and updating the communication channel identifying information of the entries.

* * * * *